Figure 8:
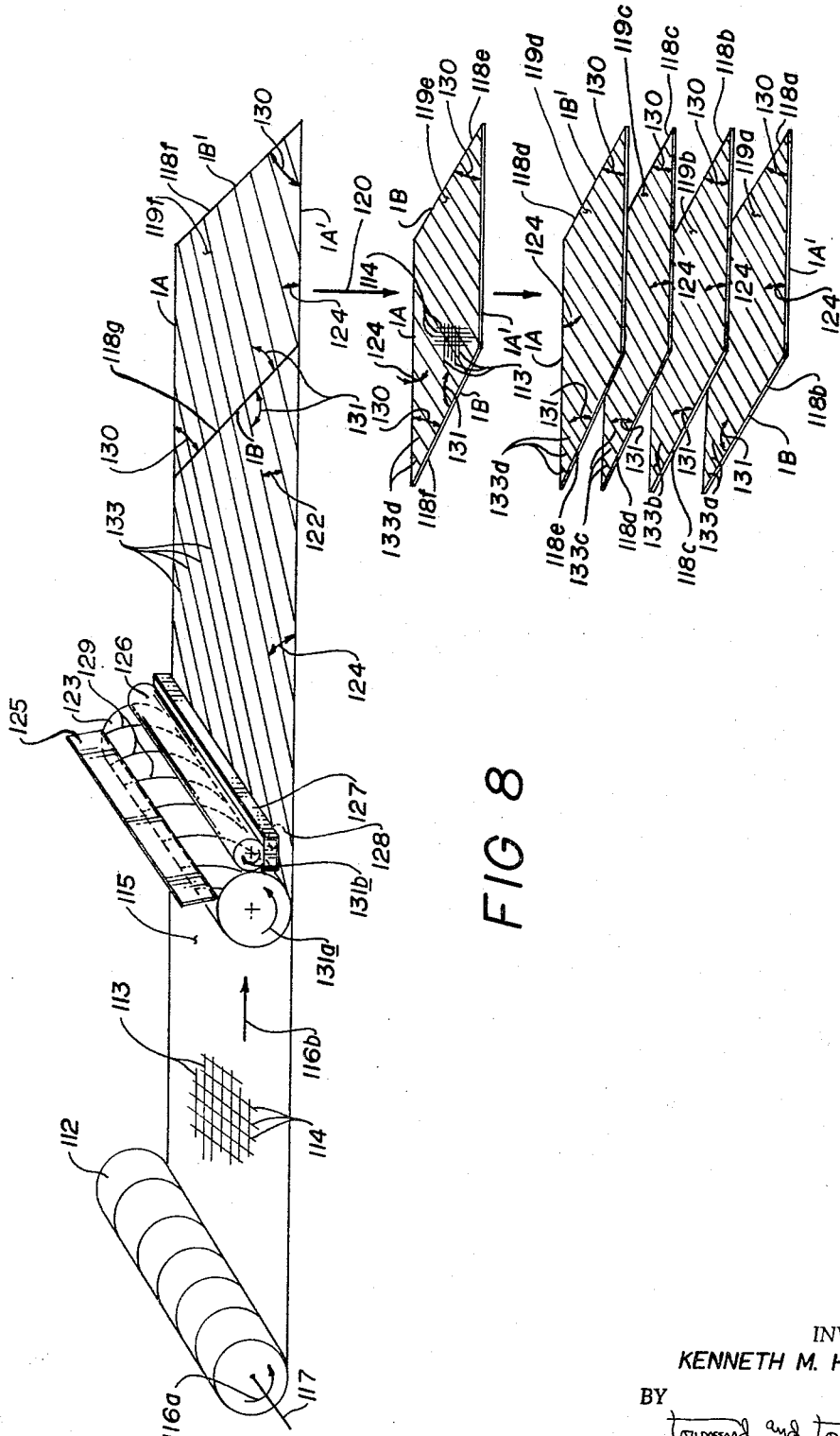

May 23, 1967  K. M. HOLLAND  3,321,355
FABRIC REINFORCED PLASTIC PRODUCT AND METHOD OF MAKING SAME
Filed April 20, 1964  2 Sheets-Sheet 1
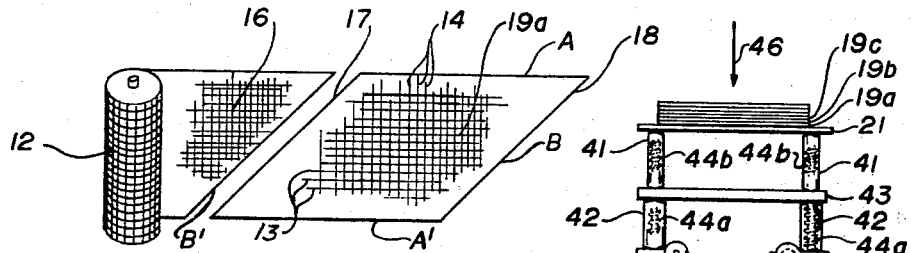
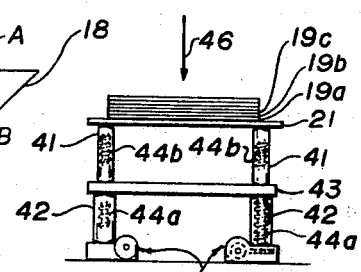
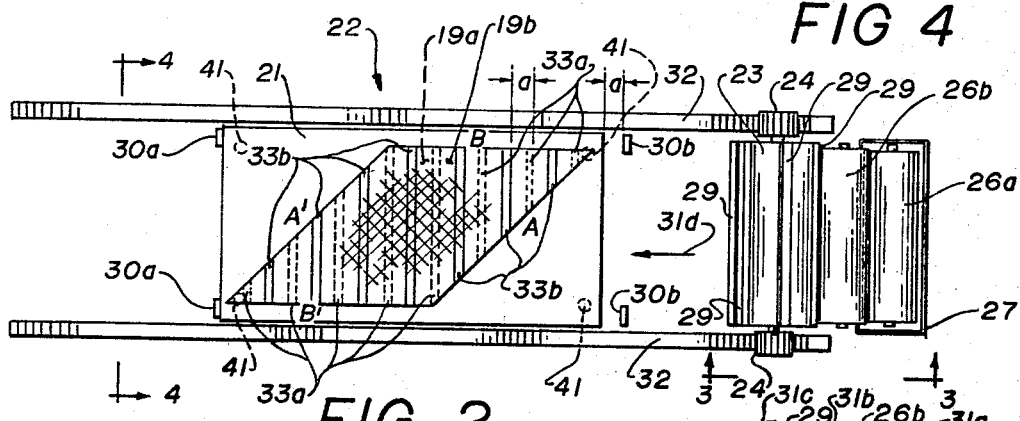
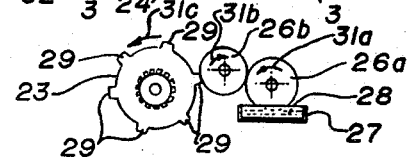
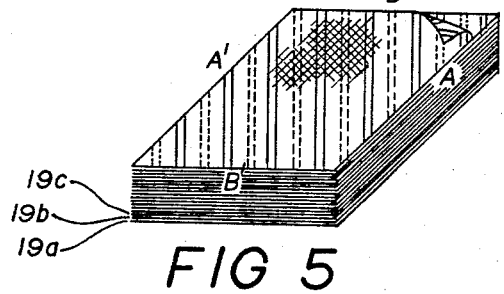
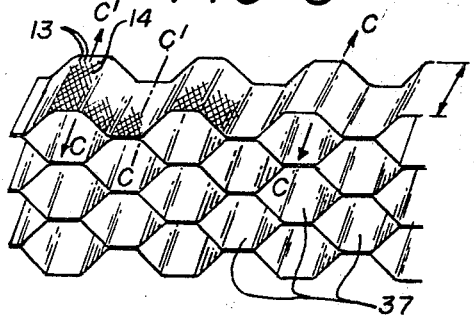
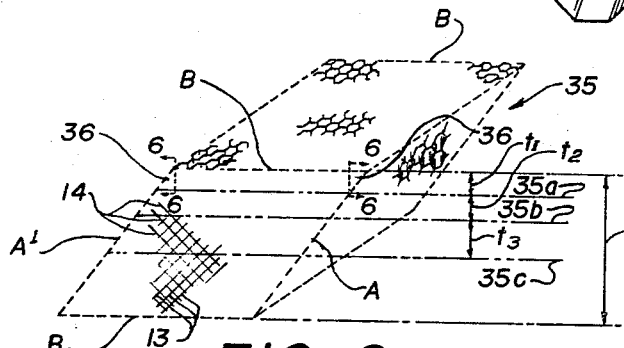
INVENTOR.
KENNETH M. HOLLAND
BY Townsend and Townsend
ATTORNEYS

INVENTOR.
KENNETH M. HOLLAND
BY
ATTORNEYS

# United States Patent Office 3,321,355
Patented May 23, 1967

3,321,355
FABRIC REINFORCED PLASTIC PRODUCT AND METHOD OF MAKING SAME
Kenneth M. Holland, Orinda, Calif., assignor to Hexcel Products, Inc., Berkeley, Calif.
Filed Apr. 20, 1964, Ser. No. 360,955
7 Claims. (Cl. 161—68)

This invention relates to a honeycomb product and method of manufacturing same. More particularly the invention relates to a section of honeycomb formed from fabric reinforced plastic in which the warp and woof of the fabric in the final honeycomb product is obliquely disposed to the longitudinal axes of the honeycomb cells.

Generally speaking structural honeycomb is produced in flat panels or sections in which the cell axes may be either parallel or perpendicular to the longitudinal axes of the web of the material from which the honeycomb is fabricated. For general instruction in the art of making honeycomb, reference is made to U.S. Patent Nos. 2,610,934; 2,674,295; 2,734,843; and for honeycomb in which the longitudinal axes of the cells are at an oblique angle to the median plane, the plane normal to the depth or T dimension of the honeycomb core section, see Patent No. 3,006,798. It is evident that if the ribbon material used in the expansion process of the latter patent reference is fabric reinforced plastic, the warp and woof of said fabric may be obliquely disposed to the longitudinal axes of the honeycomb cells. This is to be distinguished, however, from the product and method of this invention, described in greater detail below, wherein the longitudinal axes of the honeycomb cells are normal to the median plane of the core section and, in addition, the warp and woof of the fabric reinforced ribbon material of said core section are obliquely disposed to said longitudinal cell axes and the median plane of the honeycomb section. To avoid confusion or ambiguity, all references to honeycomb in this specification which follow hereinafter are understood to mean honeycomb structure wherein the longitudinal axes of the honeycomb cells are normal to the median plane of the core section.

In many applications involving the use of honeycomb core sandwich construction, loads are applied in compression parallel to the longitudinal axes of the honeycomb cells. In this type of application optimum results are obtained with honeycomb formed in accordance with conventional practice (typical examples of which are cited above) principally because the applied loads (compressive) are in direct line with the fibres of the fabric, i.e., the warp and woof, and hence there is maximum resistance to deflection or failure in the direction of said applied loads.

On the other hand there are many structural applications utilizing a honeycomb core sandwich construction where the load is not imposed in direct line parallel to the longitudinal axes of the honeycomb cells. For example, the load may be imposed at some acute angle, usually 45°, in which case it is advantageous to align the warp and woof of the fabric forming the cells at an oblique angle with respect to their longitudinal axes so that the load will be aligned with, and resisted more directly by, the fabric fibres which give the plastic reinforced material its major strength properties. An example of such loading is found wherever honeycomb core sandwich is subjected to loads applied along planes normal to the longitudinal axes of the cells. Such shear loads produce internal forces in the ribbon material of the cells themselves at 45° to their longitudinal axes. Specifically this is the case when, for example, honeycomb core sandwich forms the wall of a straight cylinder which is subjected to endwise compression. When such endwise compression becomes critical, i.e., when the structure reaches the point of so-called instability failure, the compression loading results in shearing forces exerted longitudinally along the inner and outer surfaces of the wall of the cylinder. This in turn causes internal forces at 45° to the longitudinal axes of the honeycomb core cells. Such forces are best resisted by honeycomb core formed from fabric reinforced plastic in which the warp and woof of the fabric is obliquely disposed to the longitudinal axes of the honeycomb cells as taught by this invention.

Tests that have been conducted on the product of this invention demonstrate that although the compressive strength of the material may be around 20 percent lower than that of honeycomb manufactured in accordance with conventional practice, the shear modulus of elasticity of a honeycomb section embodying the invention is increased by the unexpected and surprising increment of about 100 percent over honeycomb of more conventional design and property characteristics. Thus plastic reinforced honeycomb core made in accordance with this invention has optimum characteristics for application in structures where the core forms part of a sandwich construction that is particularly designed to resist loads applied in a direction other than parallel to the longitudinal axes of the core cells themselves; for example, a honeycomb sandwich cylinder designed to especially resist end loading in the direction of the cylinder's longitudinal axis.

Consequently the principal object of this invention is to provide a fabric reinforced plastic honeycomb core in which the warp and woof of the reinforcing fabric are disposed at oblique angles relative to the longitudinal axes of the cell openings as well as to the median plane of the structure. A feature and an advantage of this method is that such reinforced plastic honeycomb product has a high shear modulus of elasticity compared to that of honeycomb where the warp or woof of the fabric is in alignment with the longitudinal axes of the cells.

Another object of this invention is to teach a novel method of making a honeycomb product embodying this invention (and wherein the warp and woof are disposed at oblique angles to the axes of the cells) from standard rolls of fabric material in which the warp and woof run in the direction of the two major axes of the rolls.

Other numerous objects and advantages of the invention will become apparent upon reading the following specifications and referring to the accompanying drawings in which similar characters of reference represent the corresponding parts in each of the several views.

In the drawings:
FIGURE 1 shows a roll of fabric web material with one sheet cut therefrom.
FIGURE 2 is a partial plan view of the apparatus employed to produce the honeycomb stacks utilizing one embodiment of the method disclosed herein.
FIGURE 3 is a partial side elevation taken along line 3—3 of FIGURE 2.
FIGURE 4 is a partial end elevation taken along line 4—4 of FIGURE 2.
FIGURE 5 is a perspective view of a stack of sheets prior to expanding and cutting.
FIGURE 6 is a perspective view of the fully expanded stack indicated in FIGURE 5.
FIGURE 7 is a perspective enlarged view of a section of honeycomb material cut from the fully expanded stack shown in FIGURE 6.
FIGURE 8 is a partial perspective elevational view of the apparatus employed to produce the honeycomb stacks by an alternate embodiment of the method disclosed herein.

This invention teaches the product and method for making fabric reinforced plastic honeycomb structure in which the warp and woof of the reinforcing fabric are obliquely disposed at acute angles relative to the longitudinal axes of the cell openings and the median plane of the honeycomb core. The novel method for making this product comprises the steps of providing a plurality of non-rectangular parallelogram or rhomboidal shaped cut sections of fabric reinforced plastic material of substantially the same pattern and size in which the warp of the fabric extends parallel and the woof of the fabric extends perpendicular to a first opposite pair of parallel sides and at acute angles in reference to a second opposite pair of parallel sides of each cut section. The cut sections are stacked and adhered to one another along spaced apart parallel bonding lines which extend unidirectionally and substantially perpendicular to the second opposite pair of parallel sides. The bonding lines of successive sections in the stack are staggered relative to one another so that upon expansion of the stack there is formed a honeycomb structure which may be cut to form honeycomb core of various desired thicknesses.

The invention is best understood by reference to the following specifications and accompanying drawings.

In FIGURE 1 is shown a roll of fabric reinforced plastic material 12 wherein warp strands 13 of the fabric run parallel to the longitudinal axes of the web, while the woof strands 14 run at right angles thereto. Web 16 is cut diagonally along lines 17 and 18 so that a first section 19a is formed, said section having a first pair of parallel sides A—A' and a second pair of parallel sides B—B' which collectively form the four sides of a rhomboid. (A rhomboid for the purposes of this application is intended to include the case of a rhombus and all other non-rectangular parallelograms whose opposite acute angles are from about 20° to about 60°; the specific instance illustrated is a rhomboid whose acute angles are 45°.)

In the practice of the present process the roll or continuous web of fabric 12 is cut along equidistantly spaced diagonal lines to provide a plurality of rhomboidal sections 19a, 19b, 19c, etc., all of the same shape and size.

In FIGURE 2 there is indicated generally at 22 a rectangular frame with depressible platen 21 upon which is placed the first cut sheet 19a. Platen 21 is mounted as shown in FIGURE 4 and explained in greater detail hereinafter. Flexographic adhesive printing drum 23, also shown in FIGURE 3, is supported on an axle to which pinions 24 are secured. A carriage behind drum 23 provides traveling adhesive collecting drum 26a which dips into pan 27 containing a suitable liquid adhesive 28. The aforementioned carriage travels with drum 26a as pinions 24 rotate and travel along racks 32. As shown in FIGURE 2 the entire drum and adhesive assembly is in position to commence travel in a direction indicated by arrow 31d.

As drum 23 and pinion 24 are rotated in the direction indicated by arrow 31c, the entire drum and adhesive collecting assembly as shown in FIGURE 3 traverses the length of rectangular frame 24 in the direction of arrow 31d, and as shown in FIGURE 2 the said assembly moves from right to left over the frame. Adhesive collecting drum 26a rotates in the direction indicated by arrow 31a and picks up adhesive 28 which is then transferred to intermediate adhesive transfer drum 26b rotating in the direction of arrow 31b and thence to the adhesive applicating flutes 29 of drum 23, said flutes being positioned for tangential contact with drum 26b. As drums 23, 26a, 26b, pan 27 and adhesive 28 proceed in the direction of arrow 31d along frame 22 across the platen holding cut section 19a, parallel adhesive lines 33a are printed on the top surface of said sheet at regularly spaced intervals throughout its entire length and at right angles to the direction of motion indicated by arrow 31d. After completion of the pass by printing drum 23 and its assembly to a position at the far left of frame 22, a second sheet 19b is superimposed on the preceding sheet with each sheet's parallel edges A—A' and B—B' in corresponding alignment.

As shown in FIGURE 4, depressible platen 21 is carried by tubular legs 41 (two shown in FIGURE 4; all four designated in FIGURE 2) arranged to operate slidably in cylinders 42 which in turn are rigidly attached to and depend from carriage 43. Cylinders 42 house worm rods 44a which are connected at their base to well-known rotating mechanisms indicated generally at 47. Rods 44a are also fitted into tubular legs 41 and shaped to engage therein integral female worm threads 44b thus vertically supporting said legs and platen 21 attached thereto. As each cut sheet 19a, b, c, etc., is placed upon depressible platen 21, the latter is caused by a slight synchronized rotation of worm rods 44a to be lowered, in the direction of arrow 46, a distance equal to the thickness of said cut section. The rotation of the rods may be accomplished by means of a suitable mechanism 47 interconnected by appropriate gearing to an electric motor and micro-switch, or by other expedients known in the art and not shown in the drawing, as may be activated by the passage of drum 23 across platen 21 so as to cause gradually a progressive lowering of the platen to compensate for the increasing build up in height of the stack under the printing drum 23 as new cut sections are added to the stack. Thus the action of the worm rods in the tubular legs maintains a proper printing relationship between the last of sheets 19a, b, c etc., to be placed on the platen and drum 23.

In respect to horizontal movement, carriage 43, and hence platen 21, which is connected to the carriage by legs 41 in cylinders 42, is shifted from its position in contact with stops 30a (shown in FIGURE 2), after the printing of glue lines 33a on sheet 19a, to a position with the opposite edge of the carriage in contact with stops 30b a distance indicated by dimension "a" shown in FIGURE 2 and equal to the desired staggering of the glue lines on adjacent sheets. After the action of rods 44a causes platen 21 to lower a thickness of one sheet, the entire drum printing assembly is passed back across the platen in the direction opposite to that of arrow 31d to print a second series of adhesive lines 33b on the top surface of sheet 19b in parallel staggered relation to the lines 33a printed on sheet 19a. The printing drum 23 and its assembly is then back to its original position as shown in FIGURE 2, a third sheet 19c is superimposed on preceding sheet 19b, the carriage and platen again shifted from a position in contact with stops 30b to the original position with the opposite edge of the carriage in contact with stops 30a, and the platen lowered. Again the entire drum printing assembly is passed across the platen in the direction of arrow 31c to print a third sheet 19c in parallel staggered relation to lines 33b printed on the second sheet 19b.

The above process is repeated until the predetermined number of sheets 19a, 19b, 19c, 19d, etc., are stacked in exact alignment, one upon the other, and printed with adhesive lines 33a, 33b, 33c, 33d, etc., in staggered relationship to each other on successive sheets, to build up a block of unexpanded honeycomb 34 as indicated in FIGURE 5, and platen 21 carrying said sheets is caused gradually to be depressed in the direction of arrow 46 during said process.

The wet process lines are caused by drying, polymerization or other process, depending on the type or nature of adhesive used, to form permanent bonds between adjacent sheets in the stack. After such bonding is accomplished, the stack may be prepared and expanded in full block form in accordance with the method taught in the U.S. patent to Steele, No. 2,919,472, applicable to materials such as fabric reinforced plastic under consideration herein. After such expansion the fully expanded block may be cured, dipped and further cured to specific desired density to produce a finished block indicated generally at 35 of FIGURE 6, where the hexagonal cell openings are shown over a portion of the top surface of the finished block although it is understood that the entire top surface has such openings, and the truncated hexagonal cell sections resulting from the bias cut edges A—A' of sheets 19a, 19b, 19c, etc., are indicated at a portion only of the expanded block as shown in the figure. The bias of warp 13 and woof 14 to the aforementioned cell openings is also shown in FIGURE 6 at an acute angle to the longitudinal axes of the individual honeycomb cells and the median plane of the honeycomb core section. As shown, the angle between edges B and A or A' and B' is 45°, and the bias angle of warp 13 and woof 14 to the longitudinal cell axes and the median plane of the core section is also 45°.

After expanding to the full block form of total thickness T as shown in FIGURE 6, and final curing, dipping and further curing as required, the block may be cut to other desired thicknesses $t1$, $t2$, $t3$, etc., as desired by cutting along indicated lines 35a, 35b, 35c, etc., utilizing cutting techniques well known in the art.

The truncated cell sections caused by the acute angle between edges A'—B' and A—B at which the original sheets 19a, 19b, 19c, etc., are cut give rise to typical truncated end portions 36; such end portions are trimmed away along lines indicated at 6—6 as waste material. The final honeycomb core thus formed is illustrated in FIGURE 7 wherein the axes C—C' of cell openings 37 are shown disposed at 45° to warp 13 and woof 14 of the reinforced plastic fabric.

Although the preceding paragraphs state the preferred practice of this invention—the fabric reinforced honeycomb structure is expanded before cutting into smaller sections—it is understood that the unexpanded stack may be cut first into smaller sections and then expanded. In this specification and in the claims reference to "honeycomb structure" is intended to mean a honeycomb core section either before or after expansion forming open cells.

An alternative embodiment of the method of this invention can be illustrated by reference to FIGURE 8 of the drawings.

With reference to FIGURE 8, a roll of fabric reinforced material 112 with warp 113 and woof 114 parallel and perpendicular, respectively, to the selvage of web 115 is supported about said roll axis 117 for rotation in the direction indicated by arrow 116a. Web 115 proceeds in a direction indicated by arrow 116b on a typical conveyor line arrangement with proper supports, idler, and driver rollers, the latter elements being well known expedients in the art and omitted for purposes of clarity.

Web 115 passes under adhesive gravure type printing drum 123 positioned so that helical adhesive applicating grooves 129 make printing contact with the web and at an angle of 45° to the selvage as indicated at 124. Drum 123 is spaced with respect to adhesive collecting drum 126 so that the latter is also in tangential contact with helical adhesive applicating grooves 129. Adhesive collecting drum 126 rotates through pan 127 which contains adhesive 128, and, as drum 123 rotates in the direction indicated by the arrow 131a, adhesive collecting drum 126 rotates in the direction indicated by arrow 131b. Excess adhesive is removed by doctor blade 125 to drum 126 whereby adhesive remains transferred only to grooves 129 so that a continuous sequence of equidistantly spaced parallel and diagonal adhesive lines 133 are printed at an angle of 45° to the selvage on web 115 which passes in contact with the drum and in a direction toward the right hand side of the assembly shown in FIGURE 8.

As taught in U.S. Patent No. 3,114,666 to Johnson, after adhesive lines 133 are printed by a helical printing roller as described in the foregoing paragraph, said web may be continuously conveyed to the right hand side of the assembly shown in FIGURE 8 and transversely cut into sections of equal length along equidistantly spaced cut lines 118a, 118b, 118c, etc., coincident with points along the web where the adhesive lines are laterally offset one half of the pitch distance 122 from the adhesive lines of the preceding cut. The cuts along diagonals 118a, 118b, 118c, etc., are made by any suitable cutting means known in the art, are parallel to each other, at 45° relative to the selvage of the web as indicated at 130, at right angles to adhesive lines 133 as indicated at 131, and produce a predetermined number of cut sections 119a, 119b, 119c, 119d, 119e, etc. Each said cut section shown is in the shape of a rhomboid whose acute angles are 45° and having a first set of opposite parallel edges 1A–1A' and a second set of opposite parallel edges 1B–1B', although it is understood that this method may be practiced for the entire family of rhomboid shapes as defined earlier in this application.

Further, in accordance with the teaching of Johnson cited above, cut sections 119a, 119b, 119c, 119d, 119e, etc., are superposed one on the other as indicated in the lower right hand portion of FIGURE 8 and in the direction indicated by arrow 120; the superposing of said cut sections occurs in the successive order in which they are cut from web 115 whereby the result is to stagger from one another the adhesive lines of adjacent sheets one half the pitch distance 122.

For purposes of clarity, adhesive lines 133 shall be referred to hereinafter as lines 133a, 133b, 133c, etc., the suffixes a, b, c, etc., to numeral 133 identifying the adhesive lines on sheets 119a, 119b, 119c, etc., respectively. To illustrate this relationship, reference is made to the lower right hand portion of FIGURE 8 and successive sheets 119a, 119b, 119c, etc., showing said lines 133a, 133b, 133c, etc. Glue lines 133a are midway between glue lines 133b throughout their respective lengths; lines 133b midway between 133c etc. All glue lines are at 45° angles to the selvage edges 1A and 1A' as indicated at 124, at 90° angles to the cut edges 1B–1B' as indicated at 131, and at 45° angles to warp 113 and woof 114 as shown on sheet 119e.

A sequence of sheets 119a, 119b, 119c, etc., in accordance with the above steps, is stacked to build up a block of unexpanded honeycomb similar to stack 34 shown in FIGURE 5 and described earlier. Wet adhesive lines 133a, 133b, 133c, etc., are caused by drying, polymerization or other process, depending on the type or nature of adhesive used, to form permanent bonds between adjacent sheets in the stack.

After such bonding is accomplished, the stack may be prepared and expanded to full block form in accordance with the U.S. Patent to Steele No. 2,919,472, referred to hereinabove. A finished block of the type indicated at 35 in FIGURE 6 is then caused to be formed.

After expanding the stack to the full block form as above mentioned, the block may be cut to other desired thicknesses $t_1$, $t_2$, $t_3$, etc., as indicated in FIGURE 6, by techniques well known in the art. The truncated end portions are then trimmed away to form a honeycomb core section of the type shown in FIGURE 7 and C–C' of cell openings 37 are disposed at 45° to warp 13 and woof 14 (warp 113 and woof 114 in the instant case) of the reinforced plastic fabric.

It is appreciated that the method of producing the product herein described may be accomplished by hand or in other ways and on other equipment than herein described. For example, the angle at which it is desired to orient the axes of the cells with respect to the warp and woof of the reinforcing fabric may, of course, be determined and varied by varying the angle of the diagonal cuts initially made at spaced intervals across the web of the material or, in the case of the alternate method, by also printing the glue lines across the web at a different angle than that as indicated in FIGURE 8. In the above cases certain modifications would have to be made in the equipment illustrated herein. However, the methods and products have been described in some detail by way of illustration and example for purposes of clarity of understanding, and it is understood that certain changes and modifications may be practiced within the spirit of the invention and the scope of the appended claims.

I claim:
1. A fabric reinforced plastic cellular honeycomb structure in which the warp and woof of the reinforcing fabric are disposed perpendicular to each other and at approximately 45° angles relative to the axes of cell openings of the structure.

2. A method of making a fabric reinforced plastic honeycomb structure in which the warp and woof of the reinforcing fabric are disposed at acute angles relative to the longitudinal axes of cell openings of the structure comprising the steps of providing a plurality of non-rectangular parallelogram shaped cut sections of fabric reinforced plastic material of substantially the same pattern and size, and in which the warp of the fabric extends parallel and the woof of the fabric extends perpendicular to a first opposite pair of parallel sides of each said section and at acute angles in reference to a second opposite pair of parallel sides of each said section; superimposing such sections one upon the other in a stack; adhering such sections to one another along spaced apart parallel bonding lines extending unidirectionally and substantially perpendicular to said second opposite pair of parallel sides of the non-rectangular parallelogram sections, and with the bonding lines of successive said superimposed sections staggered relative to one another to form a honeycomb structure of the character hereinabove described.

3. The method of claim 2 and including the further steps of cutting and expanding said honeycomb structure into smaller honeycomb section, said cutting along lines extending parallel to said second opposite pair of parallel sides of each said section in said honeycomb structure.

4. The method comprising the steps of printing adhesive diagonally across an elongate web of fabric reinforced plastic material with the warp of the fabric extending parallel and the woof of the fabric extending perpendicular to the lengthwise axes of the web; cutting said web along equidistantly longitudinally spaced parallel diagonal cut lines, said cut lines perpendicular to the printed adhesive lines; forming by said cutting a plurality of individual sections of non-rectangular parallelogram shape of substantially the same size and pattern and in which the warp of the fabric extends parallel and the woof of the fabric extends perpendicular to a first opposite pair of parallel sides of each said section, and said warp and woof extend at acute angles in reference to a second opposite pair of parallel sides of each section; superimposing said sections one upon another in a stack with said first and second opposite pair of parallel sides in juxtaposition; adhering said sections to one another along the spaced apart parallel adhesive lines extending unidirectionally and substantially perpendicular to the second opposite pair of parallel sides of said sections, and with the adhesive lines of successive superimposed sections staggered relative to one another; and bonding the adhesive lines of successive superimposed sections thus forming a honeycomb structure of the character hereinabove described.

5. The method of claim 4 and the further steps of expanding and cutting said structure into smaller honeycomb sections, said cutting along cut lines extending parallel to the second opposite pair of parallel sides of each said section in said honeycomb structure.

6. The method comprising the steps of cutting an elongate web of fabric reinforced plastic material along equidistantly longitudinally spaced parallel diagonal cut lines; forming by said cutting a first section of rhomboidal shape with the warp of the fabric extending parallel and the woof of the fabric extending perpendicular to a first opposite pair of parallel sides of said section, and said warp and woof extending at acute angles in reference to a second opposite pair of parallel sides of said first section; printing discrete adhesive lines across said section, said lines evenly spaced apart from and parallel to each other and substantially perpendicular to said second opposite pair of parallel sides; cutting from said web a second section of substantially the same pattern and shape as said first section; superposing said second section on said first section with corresponding parallel edges and the warp and woof of said sections in juxtaposition; printing discrete adhesive lines across said second section in staggered relationship to the lines printed on said first section; then cutting, superposing and printing additional sections cut from said web to build up a stack of a predetermined number of sections with all the odd numbered sections oriented in said stack corresponding to said first section and with all the even numbered sections oriented corresponding to said second section; and bonding the discrete adhesive lines of successive superposed sections thus forming a honeycomb structure of the character hereinabove described.

7. The method of claim 6 and the further steps of expanding and cutting said structure into smaller honeycomb sections, said cutting along cut lines extending parallel to the second opposite pair of parallel sides of each said section in said honeycomb structure.

References Cited by the Examiner

UNITED STATES PATENTS 2,594,838    4/1952    Alexander et al. _____ 156—189 X
3,114,666    12/1963    Johnson _____ 156—197

EARL M. BERGERT, *Primary Examiner.*

H. F. EPSTEIN, *Assistant Examiner.*